(12) United States Patent
Glaser et al.

(10) Patent No.: US 11,237,395 B2
(45) Date of Patent: Feb. 1, 2022

(54) HIGH-RELIABILITY SPECTACLE-TYPE DEVICE AND METHOD

(71) Applicant: Siemens Aktiengesellschaft, Munich (DE)

(72) Inventors: Maximilian Glaser, Weilersbach (DE); Thomas Kersten, Marloffstein (DE); Marc Singer, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/770,494

(22) PCT Filed: Nov. 15, 2018

(86) PCT No.: PCT/EP2018/081315
§ 371 (c)(1),
(2) Date: Jun. 5, 2020

(87) PCT Pub. No.: WO2019/110263
PCT Pub. Date: Jun. 13, 2019

(65) Prior Publication Data
US 2021/0181507 A1  Jun. 17, 2021

(30) Foreign Application Priority Data

Dec. 7, 2017 (EP) .................................. 17205836

(51) Int. Cl.
*G06F 3/01* (2006.01)
*G09G 5/377* (2006.01)
(Continued)

(52) U.S. Cl.
CPC ......... *G02B 27/0172* (2013.01); *G06F 3/017* (2013.01); *G09G 5/377* (2013.01);
(Continued)

(58) Field of Classification Search
CPC .... G06F 3/017; G09G 5/377; G09G 2354/00; B25J 9/1689; B25J 13/06; G02B 2027/014; G02B 2027/0138
See application file for complete search history.

(56) References Cited

U.S. PATENT DOCUMENTS

2012/0293407 A1* 11/2012 Lee ..................... G02B 27/017
345/156
2013/0050069 A1* 2/2013 Ota ......................... G06F 3/011
345/156
(Continued)

FOREIGN PATENT DOCUMENTS

CN   104808774 A   7/2015
CN   105046752 A   11/2015
(Continued)

OTHER PUBLICATIONS

PCT International Search Report and Written Opinion of International Searching Authority dated Mar. 26, 2019 corresponding to PCT International Application No. PCT/EP2018/081315 filed Nov. 15, 2018.

*Primary Examiner* — Grace Q Li
(74) *Attorney, Agent, or Firm* — Henry M. Feiereisen LLC

(57) ABSTRACT

The invention relates to a spectacle-type device (1) in which a full image can be depicted in a reliable manner by overlapping the first partial image (α3) and the second partial image (α4), wherein a correct full image can be perceived by the operator (2), and an action can be carried out with reliability when at least two items of image information coincide. The invention also relates to a method for depicting a full image and/or for carrying out an action using a spectacle-type device.

14 Claims, 3 Drawing Sheets

(51) Int. Cl.
 *G02B 27/01* (2006.01)
 *B25J 9/16* (2006.01)
 *B25J 13/06* (2006.01)

(52) U.S. Cl.
 CPC .............. *B25J 9/1689* (2013.01); *B25J 13/06* (2013.01); *G02B 2027/014* (2013.01); *G02B 2027/0138* (2013.01); *G02B 2027/0178* (2013.01); *G09G 2354/00* (2013.01)

(56) References Cited

U.S. PATENT DOCUMENTS

| | | |
|---|---|---|
| 2015/0054743 A1 | 2/2015 | Orhand et al. |
| 2015/0154803 A1 | 6/2015 | Meier et al. |
| 2015/0206347 A1 | 7/2015 | Russell |
| 2016/0171675 A1* | 6/2016 | Tseng .................... G06F 3/0383 345/8 |
| 2018/0031618 A1* | 2/2018 | Friedlander ............ G06N 20/00 |
| 2018/0295342 A1* | 10/2018 | Takahashi ............... G01S 17/36 |

FOREIGN PATENT DOCUMENTS

| | | |
|---|---|---|
| DE | 196 25 028 C1 | 11/1997 |
| EP | 2 843 507 A1 | 3/2015 |

\* cited by examiner

HIGH-RELIABILITY SPECTACLE-TYPE DEVICE AND METHOD

CROSS-REFERENCES TO RELATED APPLICATIONS

This application is the U.S. National Stage of International Application No. PCT/EP2018/081315, filed Nov. 15, 2018, which designated the United States and has been published as International Publication No. WO 2019/110263 A1 and which claims the priority of European Patent Application, Serial No. 17205836.4, filed Dec. 7, 2017, pursuant to 35 U.S.C. 119(a)-(d).

BACKGROUND OF THE INVENTION

The invention relates to a spectacle-type apparatus and to a method for depicting a full image and/or for carrying out an action using a spectacle-type apparatus.

Only redundantly configured buttons, switches or other application-specific additional components serve as reliable input devices today, in particular for safety reasons. These are usually connected in a fixed manner to a machine—e.g. machine tool—and cannot be used flexibly.

Mainly simple systems such as lamps or printing facilities serve as reliable display devices today. Screens, too, can reproduce displays in a reliable manner. This is however associated with high expenditure. Moreover, the screens are connected in a fixed manner to a machine.

Devices that combine reliable input and reliable display have not previously been available, particularly in the field of machine tools. Furthermore, there are no such devices which are portable.

The patent specification DE 19625028 C1 describes a spectacle-type apparatus for superimposing additional information onto the field of vision of a person using a signal source transmitting visual information and an optical system projecting this information into the field of vision.

The object of the invention is to enable reliable input and/or reliable display by means of a portable apparatus.

SUMMARY OF THE INVENTION

According to one aspect of the invention, the object is achieved by a spectacle-type apparatus comprising a first computing unit, a second computing unit independent from the first computing unit, a first display unit, a second display unit independent from the first display unit, a first registration unit, a second registration unit independent from the first registration unit, wherein the first registration unit registers a first surrounding region of an operator, wherein the first registration unit converts the first surrounding region into a first item of image information which can be processed by the first computing unit, wherein the second registration unit registers a second surrounding region of the operator, wherein the second registration unit converts the second surrounding region into a second item of image information which can be processed by the second computing unit, wherein the first surrounding region and the second surrounding region overlap, wherein the first registration unit passes the first item of image information to the first computing unit, wherein the second registration unit passes the second item of image information to the second computing unit, wherein an action can be carried out when the first item of image information and the second item of image information coincide, and/or wherein the first computing unit generates a first partial image, wherein the first computing unit passes the first partial image to the first display unit, wherein the first display unit displays the first partial image, wherein the second computing unit generates a second partial image, wherein the second computing unit passes the second partial image to the second display unit, wherein the second display unit displays the second partial image, wherein a full image can be depicted reliably by overlaying the first partial image and the second partial image, wherein a correct full image can be perceived by the operator.

Further advantageous embodiments of the invention are contained in subclaims.

According to another aspect of the invention, the object is further achieved by a method for depicting a full image and/or for carrying out an action with a spectacle-type apparatus, having the following steps: registering a first surrounding region of an operator by means of a first registration unit, converting the first surrounding region into a first item of image information which can be processed by a first computing unit, registering a second surrounding region of the operator by means of a second registration unit, converting the second surrounding region into a second item of image information which can be processed by a second computing unit, passing the first item of image information from the first registration unit to the first computing unit, passing the second item of image information from the second registration unit to the second computing unit, wherein an action is carried out reliably when the first item of image information and the second item of image information coincide, and/or generating a first partial image by means of the first computing unit, passing the first partial image from the first computing unit to a first display unit, displaying the first partial image by means of the first display unit, generating a second partial image by means of the second computing unit, passing the second partial image from the second computing unit to a second display unit, displaying the second partial image by means of the second display unit, wherein a full image is depicted reliably by overlaying the first partial image and the second partial image, wherein a correct full image is perceived by the operator.

Further advantageous embodiments of the invention are contained in subclaims.

The cited sequence of the steps of the method as set forth above is not obligatory. The steps can also be carried out in a different sequence.

In this context, reliable means that the spectacle-type apparatus and/or the method for depicting a full image and/or for carrying out an action with a spectacle-type apparatus are failsafe or protected against failure.

This reliability is preferably achieved by means of redundancy.

The spectacle-type apparatus comprises redundantly configured components such as for example the first computing unit and the second computing unit.

The method for depicting a full image and/or for carrying out an action with a spectacle-type apparatus is also based on precisely this redundancy.

In one advantageous embodiment of the invention, the spectacle-type apparatus is embodied so as to operate a machine tool and/or a production machine and/or a robot.

Machine tools are machines for producing workpieces using tools, the movement of which relative to one another is predefined by the machine. Machine tools include for example lathes, milling machines, cutting machines, eroding machines, presses and power hammers. Machine tools are often embodied as CNC machines (computerized numerical control) having a computerized numerical control unit, by means of which workpieces with complex shapes can be produced in an automated manner and with high precision.

Production machines are machines which can be used to produce different things. They include for example production machines for printing newspapers, production machines which produce items by means of additive manufacturing, injection molding machines, production machines in the foodstuffs and/or beverages industry, paper machines for producing paper, cardboard and/or paperboard, and production machines for producing metals and/or sheet metal.

Robots, in particular industrial robots, are programmable machines for handling, assembling and/or processing workpieces. They are frequently used in aviation, the automotive industry, the processing of plastics, sheet metal or metals, the foodstuffs and beverages industry, medical engineering, the pharmaceuticals and cosmetics industry, and in other electrical engineering fields. The main tasks of industrial robots include assembly, gripping, general handling, loading and unloading, machine loading, painting, palletizing, positioning, milling, grinding, polishing and/or welding. They are enjoying increasing popularity in the industrial environment, as they can process workpieces in an automated and precise manner and in this context can be used more flexibly than machine tools, for example.

The operator of a machine tool and/or a production machine and/or a robot is preferably in motion in an industrial facility and/or requires free hands to operate at least one of the cited machines and/or in order to be able to work safely and efficiently. The operator frequently switches between two or more machines and therefore requires data that is up-to-date at all times, which is advantageously displayed to him in real time.

In a further advantageous embodiment of the invention, the first and/or the second display unit is embodied as a display and/or as a projector.

In a further advantageous embodiment of the invention, the spectacle-type apparatus can be worn by the operator as a head-mounted display.

The spectacle-type apparatus is preferably fastened to the head of the operator.

The spectacle-type apparatus can however also be embodied as a head-up display. Moreover, other display systems are also conceivable.

The display is preferably a device for displaying the partial image on the basis of LED technology (LED=light-emitting diode)—for example an OLED display (OLED=organic light-emitting diode)—and/or LCD technology (LCD=liquid crystal display)—for example a TFT display (FTF=thin-film transistor).

The projector projects the partial image to be displayed directly onto the retina of an eye.

The spectacle-type apparatus is preferably embodied to be binocular. Here, the first display unit shows the first partial image and the second display unit the second partial image.

In a further advantageous embodiment of the invention, the first display unit shows the first partial image to a first eye of the operator and the second display unit shows the second partial image to a second eye of the operator.

Here, the first computing unit generates the first partial image. The first computing unit passes the first partial image to the display unit, preferably by means of a "first computing unit—first display unit" data connection. The display unit displays the first partial image.

Here, the second computing unit generates the second partial image. The second computing unit passes the second partial image to the display unit, preferably by means of a "second computing unit—second display unit" data connection. The display unit displays the first partial image.

Each data connection can be embodied to be cable-free or hard-wired.

The first display unit and the second display unit preferably show an identical image content from two different perspectives or two different positions simultaneously, so that a spatial impression or an impression of depth (also referred to as 3D effect) is generated in the brain of the operator by overlaying the first partial image and the second partial image.

Here, the first and the second partial image are generated independently from one another and transmitted via two channels. This ensures a reliable depiction of the full image, which can be perceived by the operator as a correct full image.

It is perceptible to the operator if one or both partial images are incorrect. If for example the first computing unit falls, the first partial image cannot be generated. The operator is thus "blind" in the first eye. As a result, the operator perceives an incorrect full image and thus a malfunction of the spectacle-type apparatus.

If the first computing unit operates for example with a delay, the operator lacks the spatial impression in the full image because the two partial images are subject to a delay and are not displayed simultaneously.

The two display units preferably display optical warming signals and/or reminders. The operator can concentrate on time-critical, important tasks and while doing so has his hands free. Warning signals are displayed to the operator and the operator cannot overlook them inadvertently or fall to hear them, for example on account of ambient noise.

In a further advantageous embodiment of the invention, the spectacle-type apparatus is embodied as an interface between the operator and the machine tool.

The display units preferably display a virtual HMI (HMI=human machine interface) with which the machine tool and/or the production machine and/or the robot can be operated. For example, the actions "start", "stop" and/or "emergency off" can be triggered or carried out.

In a further advantageous embodiment of the invention, the first and/or the second registration unit is embodied as a camera.

The two registration units are preferably arranged at different positions. Preferably, the first registration unit registers a first perspective and the second registration unit registers a second perspective, which is different from the first perspective.

In this way, an object can be registered in the space with three coordinates (X-coordinates, Y-coordinates, Z-coordinates).

In a further advantageous embodiment of the invention, the registration unit embodied as a camera registers at least two dimensions.

For example, the first registration unit registers the X-coordinates and the Y-coordinates of an object in the first surrounding region (in other words the first item of image information) and the second registration unit registers the X-coordinates and the Z-coordinates (in other words the second item of image information) of the object in the second surrounding region. A depth recognition in the space is thus ensured.

In a further advantageous embodiment of the invention, the first computing unit and the second computing unit are associated with a higher-level computing unit, preferably for comparing the first item of image information and the second item of image information.

An evaluation of the comparison result makes it possible to perceive a correct function or a malfunction of the spectacle-type apparatus.

The virtual HMI already described preferably has at least one virtual switch or button. The virtual switch or button is preferably embodied so as to carry out the "start" action and/or the "stop" action and/or the "emergency off" action. Other actions are however also conceivable.

One button or switch is preferably assigned to each action. Multiple assignments of a switch or button with at least two actions are however also conceivable.

The operator preferably uses one finger to actuate a virtual switch or button in order to bring about an action. Here, the first registration unit registers the first surrounding region and converts this into a first item of image information, and the second registration unit comprises the second surrounding region and converts this into a second item of image information.

In this way, the object, in other words the finger, can be registered in the space as described above. The finger is preferably registered from two different perspectives by the two registration units.

The first registration unit preferably passes the first item of image information to the first computing unit, preferably by means of a "first registration unit—first computing unit" data connection. The second registration unit preferably passes the second item of image information to the second computing unit, preferably by means of a "second registration unit—second computing unit" data connection.

The first computing unit preferably passes the first item of image information to the higher-level computing unit, preferably by means of a "first computing unit—higher-level computing unit" data connection. For example, the first item of image information contains specifications on X-coordinates and Y-coordinates of the finger.

The second computing unit preferably passes the second item of image information to the higher-level computing unit, preferably by means of a "second computing unit—higher-level computing unit" data connection. For example, the second item of image information contains specifications on X-coordinates and Z-coordinates of the finger.

The higher-level computing unit preferably compares the two items of image information and, if these coincide, initiates an execution of the action. In this way, the action can be carried out reliably and via two channels.

Following on from the example just cited, the higher-level computing unit compares for example the X-coordinates of the two items of image information.

In a further advantageous embodiment of the invention, the spectacle-type apparatus is embodied as virtual reality glasses or augmented reality glasses.

Virtual reality (VR) is a simulation of a three-dimensional environment, in which the operator can look around freely and with which the operator can interact. The simulation gives him and his senses the feeling of being present therein with his entire body. This is an artificial, virtual world. The virtual reality glasses display an entirely virtual environment.

Augmented reality (AR) connects the real world with computer-generated contents. "See-through" data glasses enable the user for example to perceive his real environment while virtual, computer-generated contents and/or items of information are superimposed.

However, AR glasses also make it possible to register the real environment with at least one camera and to make this visible to the operator by way of a display unit, preferably together with virtual contents and/or items of information.

Furthermore, the spectacle-type apparatus can also be embodied as mixed reality glasses.

It is moreover possible to fit conventional AR or VR glasses with additive hardware in order to produce a spectacle-type apparatus according to the invention.

In a further advantageous embodiment of the invention, the method according to the invention is used to operate the machine tool and/or the production machine and/or the robot.

In a further advantageous embodiment of the invention, two channels are used to depict the full image and/or carry out the action.

Here, the use of two channels to depict the full image preferably means that the first partial image and the second partial image are generated independently from one another. The first partial image is generated in the first computing unit, and the second partial image is generated in the second computing unit. The first partial image is passed from the first computing unit to the first display unit, preferably by means of the "first computing unit—first display unit" data connection. The second partial image is passed from the second computing unit to the second display unit, preferably by means of the "second computing unit—second display unit" data connection.

Because it is depicted using two channels, the full image can be depicted reliably. If an incorrect full image is depicted, the operator perceives that there is a malfunction of the spectacle-type apparatus.

Here, the use of two channels to carry out the action preferably means that the virtual switch or button is preferably actuated by the finger of the operator in order to bring about an action. The first surrounding region is registered by the first registration unit and converted into the first item of image information. The second surrounding region is registered by the second registration unit and converted into the second item of image information. The first item of image information is passed to the first computing unit, preferably by means of the "first registration unit—first computing unit" data connection. The second item of image information is passed to the second computing unit, preferably by means of the "second registration unit—second computing unit" data connection.

The first item of image information is preferably passed from the first computing unit to the higher-level computing unit, preferably by means of the "first computing unit—higher-level computing unit" data connection. The second item of image information is preferably passed from the second computing unit to the higher-level computing unit, preferably by means of the "second computing unit—higher-level computing unit" data connection.

The higher-level computing unit preferably compares the first item of image information with the second item of image information. If these coincide, the execution of the action is initiated.

Because it is registered using two channels, the action can be carried out reliably.

In a further advantageous embodiment of the invention, an incorrect full image is perceived by the operator, as already described.

In a further advantageous embodiment of the invention, the action is carried out as a reaction to an operator action initiated by the operator.

The operator action is preferably the actuation of the virtual switch or button with the finger (touch) of the operator. However, the switch or button can also be actuated in a different way.

Furthermore, other types of operator action, such as a voice command, are also possible.

In a further advantageous embodiment of the invention, the operator action is carried out as a gesture.

Gestures are preferably movements of body parts, in particular of one or more arm or arms and/or one or more hand or hands.

However, other movements, such as head movements, foot and/or leg movements, are also possible.

The invention offers the advantage that the switches, buttons or application-specific additional components which are today connected in a fixed manner to the machine tool and/or the production machine and/or the robot are no longer needed. In this way, a customer benefits from reduced acquisition as well as maintenance costs.

Moreover, the operator is able at all times to access up-to-date data relating to the respective machine in real time, as a result of which productivity is increased and time is saved.

BRIEF DESCRIPTION OF THE DRAWING

The invention is described and explained in more detail below on the basis of the exemplary embodiments shown in the figures, in which.

DETAILED DESCRIPTION OF PREFERRED EMBODIMENTS

Figure 1:
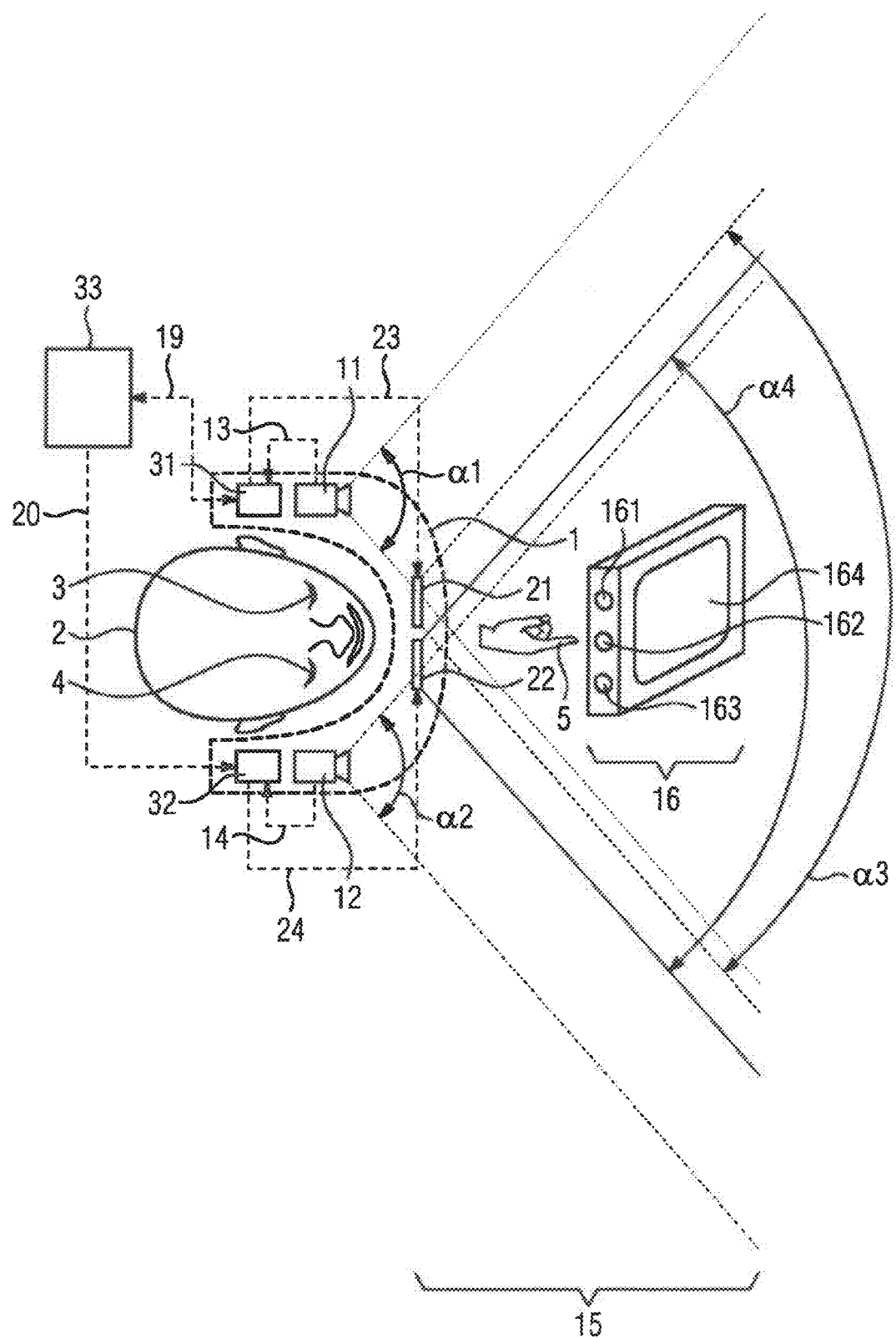
FIG. 1 shows an embodiment of a spectacle-type apparatus according to the invention.

FIG. 1 shows an embodiment of a spectacle-type apparatus 1 according to the invention. In the figure, the spectacle-type apparatus 1 is worn on the head of an operator 2. The spectacle-type apparatus 1 is advantageously embodied as a head-mounted display.

The spectacle-type apparatus 1 has two display units. The display units can be embodied as a display 21 or 22 or as a projector.

In the figure, the spectacle-type apparatus 1 has a first display 21 and a second display 22. The first display 21 displays a first partial image to a first eye 3. The second display 22 displays a second partial image to a second eye 4.

The spectacle-type apparatus 1 also has a first registration unit, which is embodied as a first camera 11. In addition, the spectacle-type apparatus 1 has a second registration unit, which is embodied as a second camera 12.

Each camera 11 or 12 can preferably register two dimensions.

The spectacle-type apparatus 1 also has a first computing unit 31 and a second computing unit 32.

The first camera 11 registers a first surrounding region $\alpha 1$ of the operator 2, and the second camera 12 registers a second surrounding region $\alpha 2$. The two surrounding regions $\alpha 1$ and $\alpha 2$ at least adjoin one another. Preferably, however, the two surrounding regions $\alpha 1$ and $\alpha 2$ overlap, as shown in the figure.

The first camera 11 converts the first surrounding region $\alpha 1$ into a first item of image information. The first item of image information can be processed by the first computing unit 31.

The second camera 12 converts the second surrounding region $\alpha 2$ into a second item of image information, which can be processed by the second computing unit.

The first camera passes the first item of image information to the first computing unit via a data connection 13. The second camera 12 passes the second item of image information to the second computing unit 32 via the data connection 14.

The data connections can be embodied as a physical connection or also cable-free.

The first computing unit 31 generates a first partial image and passes the first partial image to the first display 21 via the data connection 23.

The second computing unit 32 generates a second partial image and passes the second partial image to the second display 22 via the data connection 24.

The first display 21 represents the angle of view $\alpha 3$ shown in the figure. The second display 22 represents the angle of view $\alpha 4$ shown in the figure. The two angles of view $\alpha 3$ and $\alpha 4$ overlap and represent a projection image 15, which is visible to the operator.

As shown in the figure, a first eye 3 sees the angle of view $\alpha 3$ and a second eye 4 sees the angle of view $\alpha 4$. The first partial image in the angle of view $\alpha 3$ and the second partial image in the angle of view $\alpha 4$ are thus overlaid, as a result of which a full image is produced. A correct full image can be perceived by the operator 2. Here, the operator 2 can also perceive an incorrect full image and thus a malfunction of the spectacle-type apparatus.

In the figure, the virtual projection image 15 shows a virtual human machine interface (HMI) 16. The projection image 15 corresponds to the full image. The HMI 16 enables the operator 2 to interact with a machine tool, for example.

The first and the second camera 11 and 12 can register a surrounding of the operator. Here, the first camera registers a first surrounding region $\alpha 1$ and the second camera registers a second surrounding region $\alpha 2$. The first item of image information and the second item of image information are passed to the first computing unit 31 and the second computing unit 32 via the data connections 13 and 14.

For example, one computing unit or both computing units 31 and 32 can register the machine, for example machine tool, in front of which the operator 2 is standing and superimpose a corresponding HMI. Here, the first computing unit 31 calculates a first partial image and passes it to the first display 21 via the data connection 23. The second computing unit 32 generates a second partial image and passes it to the second display 22 via the data connection 24.

The two displays 21 and 22 display the respective partial images. The first partial image preferably corresponds to the second partial image. If one of the two partial images is incorrect, the operator 2 perceives this immediately because the two partial images do not produce a correct full image. In this way, the operator 2 perceives a malfunction of the spectacle-type apparatus 1. This enables the machine, for example the machine tool, to be operated reliably.

If for example one of the two displays 21 or 22 fails, the operator 2 perceives this because he is "blind" in one eye. Moreover, on account of the overlaying of the two partial images, a three-dimensional projection image 15 is produced.

As shown in the figure, the virtual HMI 16 comprises a virtual HMI display 164 and three virtual knobs 161, 162 and 163. The virtual knobs are embodied for example as switches or buttons.

The operator 2 can operate the virtual HMI 16 for example using a finger 5. Here, if the operator 2 presses a virtual knob 162 of the virtual HMI 16, this operator action is registered by both the first camera 11 and the second camera 12. The resulting items of image information are respectively passed to the first or second computing unit 31 or 32 via the data connection 13 or 14.

A higher-level computing unit 33 is also shown in the figure by way of example. The first computing unit 31 passes the item of image information showing the operation of the virtual HMI 16 to the higher-level control unit 33 via the data connection 19. The second computing unit 32 passes the item of image information to the higher-level computing unit 33 via the data connection 20.

The higher-level computing unit 33 can check whether the item of image information from the first camera 11 coincides with the item of image information from the second camera 12. If this is the case, an action, such as "start" the machine tool, "stop", or "emergency off", can be initiated.

Because both the registration of image information and the depiction of the full image take place using two channels and thus redundantly, a spectacle-type apparatus 1 of this type is reliable. If the item of image information from the first camera 11 and the item of image information from the second camera 12 do not coincide, an error or malfunction of the spectacle-type apparatus 1 is perceived and the action is not carried out or is stopped. The operator 2 can be informed about this malfunction, for example by means of a display field in the projection image 15. Furthermore, the placing of the machine into a safe state can be initiated, for example by the higher-level computing unit 33.

A communication between the spectacle-type apparatus 1 and the machine tool is possible, for example by means of cables or also radio. An optical transmission of data for communication purposes is also conceivable. The spectacle-type apparatus 1 described enables what are known as 3D glasses to be integrated into the industrial environment.

Figure 2:
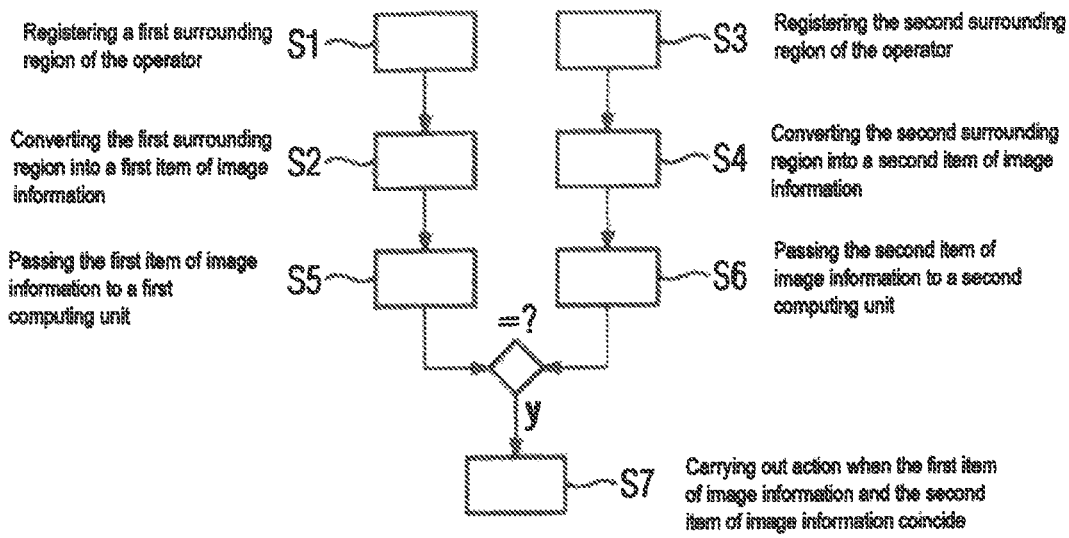
FIG. 2 shows a method for carrying out an action according to the invention.

FIG. 2 shows a method for carrying out an action according to the invention.

In method step S1, the first surrounding region of the operator is registered by the first registration unit.

In method step S2, the first surrounding region is converted into the first item of image information, which can be processed by the first computing unit.

In method step S5, the first item of image information is passed from the first registration unit to the first computing unit.

In method step S3, the second surrounding region of the operator is registered by the second registration unit.

In method step S4, the second surrounding region is converted into the second item of image information, which can be processed by the second computing unit.

In method step S6, the second item of image information is passed from the second registration unit to the second computing unit.

If the first item of image information and the second item of image information coincide—indicated in the figure with=?—the action is carried out reliably in method step S7. This path is indicated in the figure with y.

An action is for example "start", "stop" or "emergency of" of a machine tool.

Figure 3:
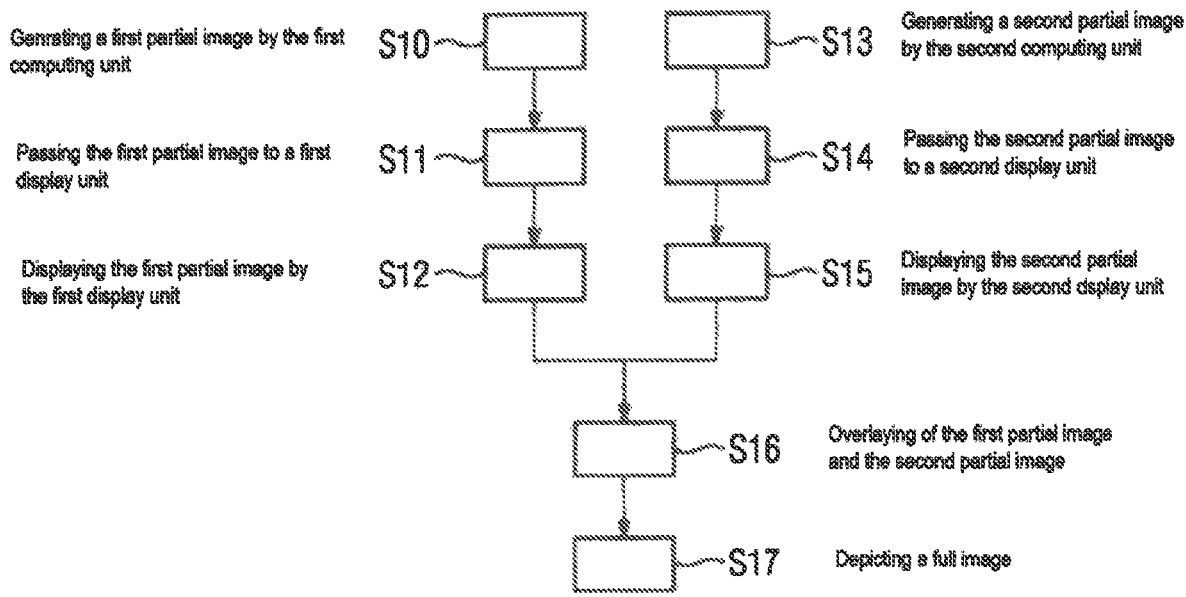
FIG. 3 shows a method for depicting a full image according to the invention.

FIG. 3 shows a method for depicting a full image according to the invention.

In method step S10, the first partial image is generated by the first computing unit.

In method step S11, the first partial image is passed from the first computing unit to the first display unit.

In method step S12, the first partial image is displayed by the first display unit.

In method step S13, the second partial image is generated by the second computing unit.

In method step S14, the second partial image is passed from the second computing unit to the second display unit.

In method step S15, the second partial image is displayed by the second display unit.

By an overlaying of the first partial image and the second partial image in method step S16, a full image can be depicted reliably because the operator perceives in method step S17 whether a correct full image is present.

The operator also perceives an incorrect full image and in this way can identify a defective spectacle-type apparatus.

Figure 4:
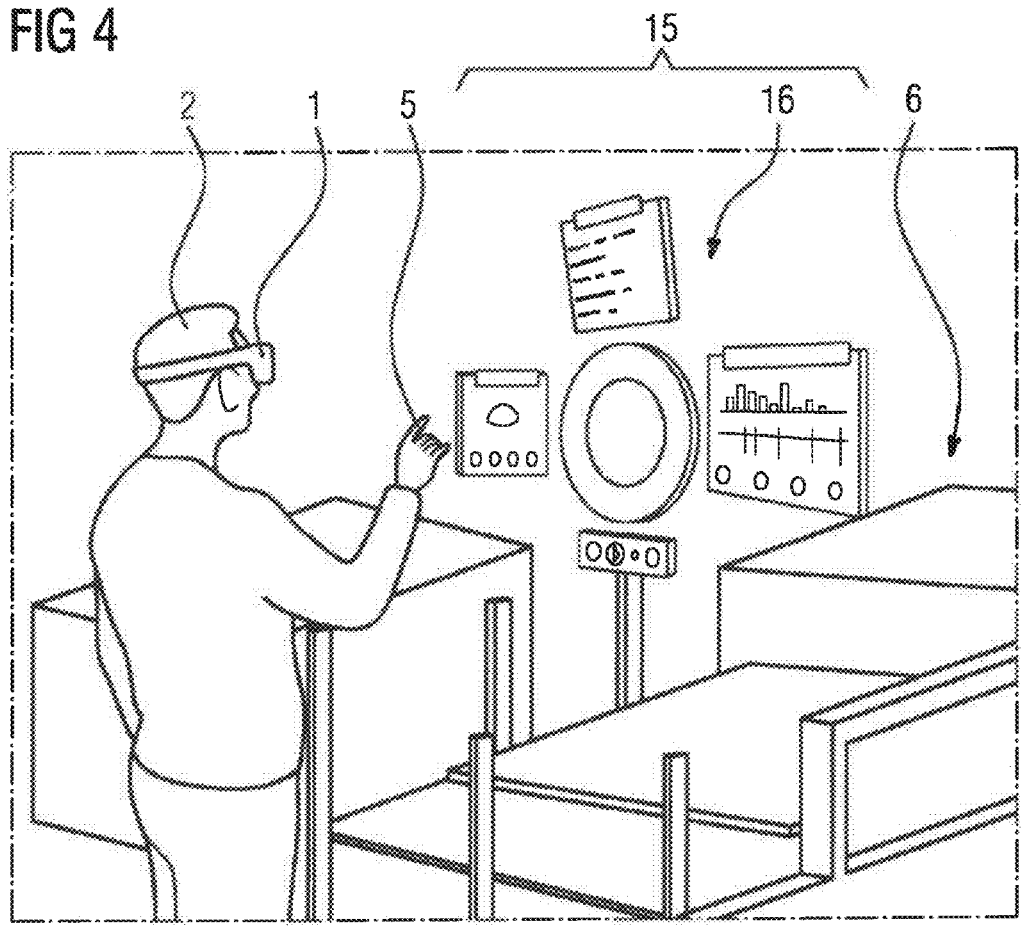
FIG. 4 shows an operator with a spectacle-type apparatus in front of a machine tool and a superimposed projection image.

FIG. 4 shows an operator 2 with a spectacle-type apparatus 1 in front of a machine tool 6 and a superimposed projection image 15.

The figure shows that the operator 2 wishes to use a finger 5 to press a virtual knob in the virtual projection image 15. The projection image 15 has an HMI 16. This enables the interaction between the operator 2 and the machine tool 6. In the figure, the HMI 16 is superimposed as part of an augmented reality. This means that the operator 2 sees a virtual projection image 15 of the HMI 16 in a real surrounding.

For example, the two registration units register the surrounding of the operator. The registered surrounding is displayed to the operator together with the virtual projection image 15 by means of the two display units.

What is claimed is:

1. A spectacle-type apparatus for operating a machine tool, a production machine and/or a robot, said apparatus comprising:
    a first display unit;
    a second display unit independent from the first display unit;
    a first registration unit configured to register a first surrounding region of an operator and to convert the first surrounding region into a first item of image information;
    a second registration unit independent from the first registration unit and configured to register a second surrounding region of the operator in overlapping relationship to the first surrounding region and to convert the second surrounding region into a second item of image information;
    a first computing unit receiving the first item of image information from the first registration unit and generating a first partial image for passing to the first display unit and display by the first display unit;
    a second computing unit independent from the first computing unit, said second computing unit receiving the second item of image information from the second registration unit and generating a second partial image for passing to the second display unit and display by the second display unit,
    said spectacle-type apparatus configured to generate and display a full image using two channels by overlaying the first partial image and the second partial image, with one of the two channels being defined by a data connection between the first registration unit and the first computing unit for passing the first item of image information from the first registration unit to the first computing unit, and with the other one of the two channels being defined by a data connection between the second registration unit and the second computing unit for passing the second item of image information from the second registration unit to the second computing unit, and further comprising a higher-level computing unit operably connected to the first and second computing units for comparing the first item of image information and the second item of image information, said spectacle-type apparatus being embodied as an interface between the operator and the machine tool, the production machine and/or the robot and comprising a virtual HMI (Human-Machine Interface) having a virtual switch or button to enable the operator to carry out a reliable action by the machine tool, the production machine and/or the robot with a finger of the operator when the first item of image information and the second item of image information coincide, and to stop or not carry out the reliable action of the machine tool, the production machine and/or the robot when the first item of image information and the second item of image information do not coincide which is indicative of an error or malfunction of the spectacle-type apparatus.

2. The spectacle-type apparatus of claim 1, wherein the higher-level computing unit is configured to place the machine tool, the production machine and/or the robot into a safe state when the first item of image information and the second item of image information do not coincide.

3. The spectacle-type apparatus of claim 1, wherein at least one of the first and second display units is embodied as a display and/or as a projector.

4. The spectacle-type apparatus of claim 1, wherein the first display unit shows the first partial image to a first eye of the operator, and wherein the second display unit shows the second partial image to a second eye of the operator.

5. The spectacle-type apparatus of claim 1, wherein at least one of the first and second registration units is embodied as a camera.

6. The spectacle-type apparatus of claim 5, wherein the camera registers at least two dimensions.

7. The spectacle-type apparatus of claim 1, constructed in the form of virtual reality glasses or augmented reality glasses.

8. The spectacle-type apparatus of claim 1, constructed to be worn by the operator as a head-mounted display.

9. A method for operating a machine tool, a production machine and/or a robot with a spectacle-type apparatus as set forth in claim 1.

10. A method, comprising:
registering a first surrounding region of an operator by a first registration unit;
converting the first surrounding region into a first item of image information;
registering a second surrounding region of the operator by a second registration unit;
converting the second surrounding region into a second item of image information;
passing the first item of image information from the first registration unit to a first computing unit;
passing the second item of image information from the second registration unit to a second computing unit; and
executing a reliable action of a machine tool, a production machine and/or a robot, when the first item of image information and the second item of image information coincide, via two channels through actuation of a virtual switch of button with the finger of the operator, with one of the channels being defined by a data connection between the first registration unit and the first computing unit for passing the first item of image information from the first registration unit to the first computing unit, and with the other one of the channels being defined by a data connection between the second registration unit and the second computing unit for passing the second item of image information from the second registration unit to the second computing unit, said method further comprising comparing the first item of image information with the second item of image information by a higher-level computing unit to determine whether the first item of image information and the second item of image information coincide to initiate execution of the reliable action.

11. The method of claim 10, further comprising:
generating a first partial image by the first computing unit;
passing the first partial image from the first computing unit to a first display unit;
displaying the first partial image by the first display unit;
generating a second partial image by the second computing unit;
passing the second partial image from the second computing unit to a second display unit;
displaying the second partial image by the second display unit; and
overlaying the first partial image and the second partial image to enable the operator to determine whether a resultant full image is correct or incorrect.

12. The method of claim 11, wherein the full image is depicted via the channels, with the first partial image being generated in the first computing unit in one of the channels and passed from the first computing unit to the first display unit, and with the second partial image being generated in the second computing unit in the other one of the channels passed from the second computing unit to the second display unit.

13. The method of claim 10, wherein the reliable action is carried out as a reaction to an operator action initiated by the operator.

14. The method of claim 13, wherein the operator action is carried out as a gesture.

* * * * *